US012737978B2

(12) United States Patent
Bastyr et al.

(10) Patent No.: US 12,737,978 B2
(45) Date of Patent: Sep. 15, 2026

(54) HEAD AND EAR TRACKING USING IMAGE SCALING WITH EMOTION DETECTION

(71) Applicant: HARMAN INTERNATIONAL INDUSTRIES, INCORPORATED, Stamford, CT (US)

(72) Inventors: Kevin J. Bastyr, Franklin, MI (US); Abdullah Kucuk, Novi, MI (US); Vilayphone Vilaysouk, White Lake, MI (US); Dariusz Jerzy Rzeszotarski, Platowcowa (PL)

( * ) Notice: Subject to any disclaimer, the term of this patent is extended or adjusted under 35 U.S.C. 154(b) by 103 days.

(21) Appl. No.: 18/972,018

(22) Filed: Dec. 6, 2024

(65) Prior Publication Data

US 2025/0191291 A1 Jun. 12, 2025

Related U.S. Application Data

(60) Provisional application No. 63/608,524, filed on Dec. 11, 2023.

(51) Int. Cl.
*G06T 17/00* (2006.01)
*G06V 40/16* (2022.01)

(52) U.S. Cl.
CPC ............ *G06T 17/00* (2013.01); *G06V 40/171* (2022.01); *G06V 40/174* (2022.01)

(58) Field of Classification Search
None
See application file for complete search history.

(56) References Cited

U.S. PATENT DOCUMENTS

| | | | | |
|---|---|---|---|---|
| 10,846,517 | B1 * | 11/2020 | Bulusu | G06V 40/161 |
| 10,869,626 | B2 * | 12/2020 | Krupat | A61B 5/165 |
| 2012/0162204 | A1 * | 6/2012 | Vesely | G06F 3/0325 345/419 |
| 2015/0242679 | A1 * | 8/2015 | Naveh | G06V 40/174 382/100 |
| 2020/0245873 | A1 * | 8/2020 | Frank | A61B 5/0823 |
| 2021/0219086 | A1 * | 7/2021 | Osman | H04S 7/304 |
| 2022/0309704 | A1 * | 9/2022 | Shimizu | G06T 7/248 |

OTHER PUBLICATIONS

Dellepiane et al., "Reconstructing Head Models from Photographs for Individualized 3D-Audio Processing", Pacific Graphics, vol. 27, No. 7, 2008, pp. 1719-1727.

(Continued)

*Primary Examiner* — Jason A Pringle-Parker
(74) *Attorney, Agent, or Firm* — Artegis Law Group, LLP

(57) ABSTRACT

Techniques for image scaling based on emotion detection are described. In some embodiments, the techniques include acquiring one or more images of a user, processing the one more images to generate emotion-specific three-dimensional (3D) positions of ears of the user based on a 3D head geometry and an emotion of the user, where the emotion is identified based on the one or more images of the user, and processing one or more audio signals to generate one or more processed audio signals based on the three-dimensional positions of the ears. Further embodiments include systems and non-transitory computer-readable media that perform the steps of the method.

20 Claims, 6 Drawing Sheets

(56) References Cited

OTHER PUBLICATIONS

Generosi et al., “An Innovative System for Driver Monitoring and Vehicle Sound Interaction”, IEEE International Workshop On Metrology For Automotive, DOI: 10.1109/METROAUTOMOTIVE61329.2024.10615427, 2024, pp. 159-164.
Deng et al., “Accurate 3D Face Reconstruction with Weakly-Supervised Learning: From Single Image to Image Set”, Conference on Computer Vision and Pattern Recognition, 2019, 11 pages.
Wu et al., “Synergy between 3DMM and 3D Landmarks for Accurate 3D Facial Geometry”, International Conference on 3D Vision, arXiv:2110.09772, Jan. 17, 2024, 23 pages.
Lugaresi et al., “MediaPipe: A Framework for Building Perception Pipelines”, arXiv: 1906.08172, Jun. 14, 2019, pp. 1-9.
King, Davis E., “Dlib-ml: A Machine Learning Toolkit”, Journal of Machine Learning Research, vol. 10, Jul. 2009, pp. 1755-1758.
Wikipedia, “Pitch, Yaw, and Roll”, retrieved from https://simple.wikipedia.org/wiki/Pitch,_yaw,_and_roll, 2024, 1 page.
Fischler et al., “Random Sample Consensus: A Paradigm for Model Fitting with Applications to Image Analysis and Automated Cartography”, Graphics and Image Processing vol. 24, No. 6, Jun. 1981, pp. 381-395.
Day, Matthew, “Exploiting Facial Landmarks for Emotion Recognition in the Wild”, ACM International Conference on Multimodal Interaction, Nov. 2015, 4 pages.
Bradski, Gary, “The Open CV Library”, Dr. Dobb Journal of Software Tools, Nov. 1, 2000, 7 pages.
Wikipedia, “Facial Action Coding System”, 1978, 11 pages.
Ekman et al., “Introduction to EMFACS”, accessed on Jan. 30, 2025, 1 page.

* cited by examiner

HEAD AND EAR TRACKING USING IMAGE SCALING WITH EMOTION DETECTION

CROSS-REFERENCE TO RELATED APPLICATIONS

This application claims the benefit of U.S. Provisional patent application titled, "HEAD AND EAR TRACKING USING IMAGE SCALING WITH EMOTION DETECTION," filed on Dec. 11, 2023, and having Ser. No. 63/608,524. The subject matter of this related application is hereby incorporated herein by reference.

BACKGROUND

Field of the Various Embodiments

This application relates to systems and methods for head and car tracking, and more specifically, to head and car tracking using image scaling with emotion detection.

Description of the Related Art

Headrest audio systems, seat or chair audio systems, sound bars, vehicle audio systems, and other personal and/or near-field audio systems are gaining popularity. However, the sound experienced by a user of a personal and/or near-field audio system can vary significantly (e.g., 3-6 dB or another value) when a listener moves their head, even very slightly. In the example of headrest audio systems, depending on how the user is positioned in a seat and how the headrest is adjusted, the variation from one person using the audio system to another person can also vary significantly. This level of sound pressure level (SPL) variability makes tuning audio systems difficult. Furthermore, when rendering spatial audio over headrest speakers, this variability causes features like crosstalk cancellation to fail. One way of correcting audio for personal and/or near-field audio systems is camera-based head tracking. Camera-based head tracking is finding its way into vehicles, personal computer gaming, and home theaters as a result of the increasing adoption of driver monitoring systems (DMS), consumer gaming (and other) sound bars that include imaging devices, and web cameras.

However, one drawback of existing camera-based head and/or car tracking is that the camera image has no physical scale. A camera image includes pixels that are not generally capable of dimensioning or scaling the objects represented therein, because a head or face in the image can be closer or farther away depending on seating position, standing position, and other user positioning. In systems that include scaling, the conventional approach to perform scaling of pixels to distance units involves the use of a presumptive dimension such as an average inter-ocular distance (e.g., distance between the pupils. However, the inter-ocular distance varies significantly between 54 to 68 mm for adults. Other presumptive dimensions include average horizontal visible iris diameter (HVID), which can be 11.6 mm to 12.0 mm, having an average of 11.8+/−0.2 mm for 50% of people. Some estimates indicate average HVID dimensions of 11.6+/−12%, which is unfortunately similar in accuracy to the inter-ocular distance and so is not a high enough tolerance to yield accurate image scaling. The tolerance produced by using presumptive dimensions is an unacceptable tolerance for personal and/or near-field audio systems, such as headrest speaker systems and the like, to account for head movement of a user.

A further drawback of existing camera-based head and/or ear tracking is that the existing systems do not account for user emotion (e.g., facial gestures and/or manipulations). For example, when a user is expressing emotions using the face, the distance between facial landmarks change, often causing errors in traditional systems. Moreover, when a user talks, some of the lengths between landmarks will increase or decrease in length. As a user speaks, the user will appear to get closer to and further from the camera, while in fact they are not moving relative to the camera. These considerations are not accounted for in traditional head tracking systems.

As the foregoing illustrates, what is needed in the art is improved camera-based tracking for audio systems and the like.

SUMMARY

One embodiment of the present disclosure sets forth a method that includes acquiring one or more images of a user, processing the one more images to generate emotion-specific three-dimensional (3D) positions of ears of the user based on a 3D head geometry and an emotion of the user, where the emotion is identified based on the one or more images of the user, and processing one or more audio signals to generate one or more processed audio signals based on the three-dimensional positions of the ears. Further embodiments include systems and non-transitory computer-readable media that perform the steps of the method.

At least one technical advantage of the disclosed techniques relative to the prior art is that, with the disclosed techniques, accuracy of camera-based head and/or ear tracking is improved. The improved camera-based tracking provides improved noise cancellation, improved crosstalk cancellation, and otherwise improved three-dimensional audio listening experience to users for personal and/or near-field audio systems such as headrest audio systems, seat/chair audio systems, sound bars, vehicle audio systems, and/or the like. The techniques described also enable the use of a single standard imaging camera to track emotion-specific and user-specific scaled ear positions in three dimensions. These technical advantages represent one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

Figure 1:
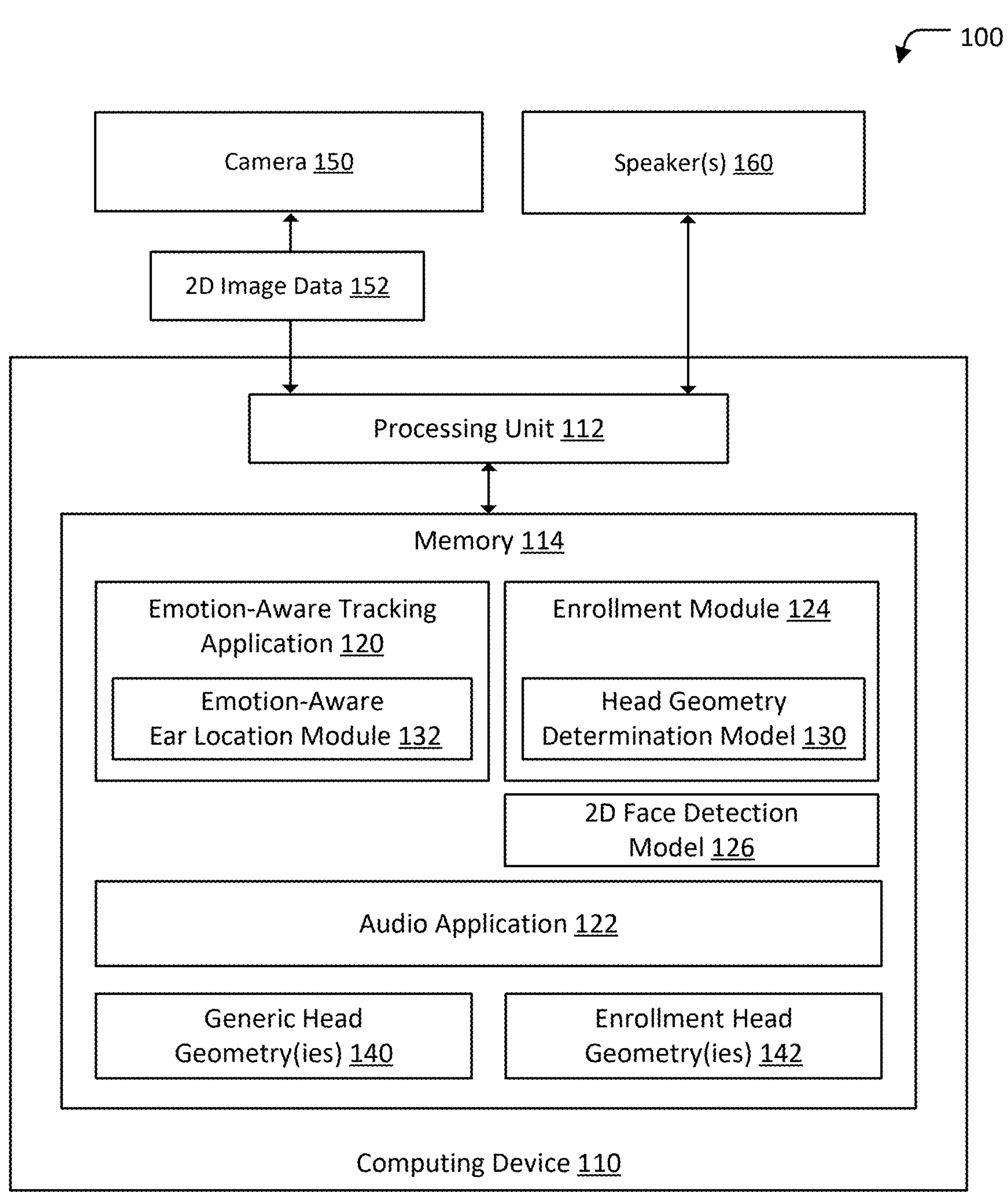
FIG. 1 is a schematic diagram illustrating a computing system according to various embodiments.

FIG. 1 is a schematic diagram illustrating a computing system 100 according to various embodiments. As shown, the computing system 100 includes, without limitation, a computing device 110, one or more cameras 150, and one or more speakers 160. One or more computing devices 110 include, without limitation, one or more processing units 112 and one or more memories 114. In various embodiments, an interconnect bus (not shown) connects the one or more processing units 112, the one or more memories 114, the speakers 160, the one or more cameras 150, and any other components of the computing device 110. The one or more memories 114 store, without limitation, an emotion-aware tracking application 120, an audio application 122, as well as one or more generic head geometries 140, and one or more enrollment head geometries 142. The emotion-aware tracking application 120 includes or utilizes, without limitation, an enrollment module 124, a face detection model 126, a head geometry determination model 130, and an emotion-aware car location module 132. While shown separately from the emotion-aware tracking application 120, the enrollment module 124, face detection model 126, and head geometry determination model 130 can include executable instructions that work in concert with the emotion-aware tracking application 120 as submodules and/or separate software modules.

In operation, the computing system 100 processes two-dimensional image data 152 in real-time to perform emotion-specific image scaling. The emotion-aware tracking application 120 tracks emotion-specific ear locations based on the one or more generic head geometries 140 and/or the one or more enrollment head geometries 142. In some embodiments, the emotion-aware tracking application 120 uses a single head geometry (e.g., a generic head geometry 140 or an enrollment head geometry 142) to identify an emotion-aware depth scaling factor, and uses the emotion-aware depth scaling factor to generate emotion-specific car locations. In other embodiments, the emotion-aware tracking application 120 uses multiple different emotion specific head geometries (e.g., generic head geometries 140 or enrollment head geometries 142) to generate emotion-specific car locations.

The one or more processing units 112 can be any suitable processor, such as a central processing unit (CPU), a graphics processing unit (GPU), an application-specific integrated circuit (ASIC), a field programmable gate array (FPGA), a digital signal processor (DSP), and/or any other type of processing unit, or a combination of different processing units, such as a CPU configured to operate in conjunction with a GPU and/or a DSP. In general, a processing unit 112 can be any technically feasible hardware unit capable of processing data and/or executing software applications.

Memory 114 can include a random-access memory (RAM) module, a flash memory unit, or any other type of memory unit or combination thereof. Processing units 112 are configured to read data from and write data to the memory 114. In various embodiments, a memory 114 includes non-volatile memory, such as optical drives, magnetic drives, flash drives, or other storage. In some embodiments, separate data stores, such as an external data stores included in a network ("cloud storage") can supplement the memory 114. The one or more memories 114 store, without limitation, emotion-aware tracking application 120, audio application 122, as well as generic head geometries 140 and enrollment head geometries 142. The emotion-aware tracking application 120 within the one or more memories 114 can be executed by one or more processing units 112 to implement the overall functionality of the one or more computing devices 110 and, thus, to coordinate the operation of the computing system 100 as a whole.

The one or more cameras 150 include various types of cameras for capturing two-dimensional images of the user. The one or more cameras 150 include a camera of a DMS in a vehicle, a sound bar, a web camera, and/or the like. In some embodiments, the one or more cameras 150 include only a single standard two-dimensional imager without stereo or depth capabilities. In some embodiments, the computing system 100 includes other types of sensors in addition to the one or more cameras 150 to acquire information about the acoustic environment. Other types of sensors include, without limitation, motion sensors, such as an accelerometer or an inertial measurement unit (IMU) (e.g., a three-axis accelerometer, gyroscopic sensor, and/or magnetometer), pressure sensors, and so forth. In addition, in some embodiments, sensor(s) can include wireless sensors, including radio frequency (RF) sensors (e.g., sonar and radar), and/or wireless communications protocols, including Bluetooth, Bluetooth low energy (BLE), cellular protocols, and/or near-field communications (NFC).

The speakers 160 include various speakers for outputting audio to create the sound field or the various audio effects in the vicinity of the user. In some embodiments, the speakers 160 include two or more speakers located in a headrest of a seat such as a vehicle seat or a gaming chair, or another user-specific speaker set connected or positioned for use by a single user, such as a personal and/or near-field audio system. In some embodiments, the speakers 160 are associated with a speaker configuration stored in the memory 114. The speaker configuration indicates locations and/or orientations of the speakers 160 in a three-dimensional space and/or relative to one another and/or relative to a vehicle, a vehicle seat, a gaming chair, a location of the camera 150, and/or the like. The audio application 122 can retrieve or otherwise identify the speaker configuration of the speakers 160.

The two-dimensional image data 152 includes one or more images of the user captured by a camera 150. The camera 150 continues to capture images of the user over time. Some embodiments of the emotion-aware tracking application 120 involve an enrollment module 124 that performs an enrollment to generate one or more enrollment head geometries 142. During enrollment, the enrollment module 124 selects one or more enrollment images based on certain criteria. The enrollment generates one or more enrollment head geometries 142 that are user-specific to the user. Some embodiments of the enrollment module 124 generate a single enrollment head geometry 142 corresponding to a neutral emotion. If a single enrollment head geometry 142 is used, the emotion-aware car location module 132 identifies an emotion-aware depth scaling factor to account for various different emotions such as talking, facial gestures and other facial manipulations. Other embodiments of the enrollment module 124 generate a set of emotion-specific enrollment head geometries 142, and the emotion-aware car location module 132 selects an emotion-specific enrollment head geometry 142 to generate emotion-specific car locations. The set of emotion-specific enrollment head geometries 142 can include the neutral emotion enrollment head geometries 142 as well as enrollment head geometries 142 for other facial emotions. In examples where the enrollment module 124 generates a set of emotion-specific enrollment head geometries 142, the selection criteria specifies a corresponding set of emotions to identify in the two-dimensional image data 152. The selection criteria can specify one or more facial orientations to capture for each emotion. If a single enrollment head geometry 142 is to be generated, the selection criteria can specify one facial orientation or multiple facial orientations. To this end, in some examples the enrollment module 124 generates audio (e.g., using the speakers 160) and/or visual (e.g., using a display device, not shown) user instructions indicating for the user to make a particular facial gesture or emotion such as speaking, laughing, smiling, and the like.

In some embodiments, the enrollment image(s) are further selected from the two-dimensional image data 152 based on successfully detecting a face using the face detection model 126. The face detection model 126 includes a machine-learning model, a rule-based model, or another type of model that takes two-dimensional image data 152 as input and generates two-dimensional landmarks and/or face detection statuses. Additionally or alternatively, the enrollment image(s) are selected as a subset of images from the two-dimensional image data 152 that are associated with a particular head orientation or range of head orientations identified using the head orientation detector of the enrollment module 124. The enrollment module 124 includes a rules-based module or program that detects or identifies a face orientation such as a face orientation status (e.g., centered and/or facing forward, facing upward, facing downward, facing left, facing right). Enrollment includes a relatively short period of time (e.g., within 30 seconds, within 45 seconds, or within 1 minute) that is not required to be performed in real-time. Because the enrollment is relatively fast, in some embodiments, no car locations are provided in the relatively short enrollment period. In examples where enrollment is not completed, the emotion-aware tracking application 120 is capable of providing emotion-specific car locations based on the one or more generic head geometries 140 and the two-dimensional image data 152 to improve the pre-enrollment performance of the system. In some examples, enrollment is not performed, and the emotion-specific car locations are not user-specific. Even in examples where the emotion-specific car locations are not user-specific, the emotion-aware aspects of the system provide significant benefits in accuracy over traditional systems.

The enrollment module 124 provides the one or more enrollment images as input to the head geometry determination model 130. The head geometry determination model 130 generates a scaled enrollment head geometry 142 based on the one or more enrollment images selected from the two-dimensional image data 152. The head geometry determination model 130 can include a machine-learning model, a rule-based model, or another type of model that takes two-dimensional image data 152 as input and generates three-dimensional enrollment head geometry 142. In some embodiments, inputs to the head geometry determination model 130 include camera data such as sensor size of the camera, a focal distance of the camera, and/or the like. Once enrollment is performed, the emotion-aware tracking application 120 uses the enrollment head geometry 142 and 'live' or most-recently-captured two-dimensional image data 152 to identify user-specific car locations.

The emotion-aware tracking application 120 identifies a number of pixels between a two-dimensional landmark pair (e.g., identified using the face detection model 126) in the two-dimensional image data 152, and generates a depth estimate generated using the enrollment head geometry 142. The emotion-aware tracking application 120 uses this information to generate car locations that are scaled, user-specific, and three-dimensional. In some embodiments, the emotion-aware tracking application 120 also provides head orientation data that to the audio application 122.

The emotion-aware tracking application 120 provides the car locations, and in some embodiments head orientation data, to an audio application 122 that modifies audio signals. As such, the emotion-aware tracking application 120 performs camera-based head and/or car position tracking based on two-dimensional image data 152 captured using a camera 150. The audio application 122 uses the emotion-specific car locations, and in some examples head orientation data, speaker configuration data, and/or an input audio signal, to generate a set of modified and/or processed audio signals. The modified and/or processed audio signals affect a sound field and/or provide various adaptive audio effects such as noise cancellation, crosstalk cancellation, spatial/positional audio effects and/or the like, where the adaptive audio effects adapt to the car position of the user. For example, the audio application 122 can identify one or more head-related transfer functions (HRTFs) based on the car locations, head orientation, and speaker configuration. In some examples, the HRTFs are car-specific to each car. The audio application 122 modifies one or more speaker-specific audio signals based on the HRTFs to maintain a desired audio effect that dynamically adapts to the emotion-specific car positions. In some embodiments, the audio application 122 generates a set of modified or processed audio signals corresponding to a set of speakers 160. In examples where enrollment is performed, the emotion-aware tracking application 120 provides scaled user-specific and emotion-specific car locations in real-time (e.g., within 10 ms), or near-real-time (e.g. within 100 ms).

In various embodiments, the one or more computing devices 110 are included in a vehicle system, a home theater system, a soundbar and/or the like. In some embodiments, one or more computing devices 110 are included in one or more devices, such as consumer products (e.g., portable speakers, gaming, etc. products), vehicles (e.g., the head unit of an automobile, truck, van, etc.), smart home devices (e.g., smart lighting systems, security systems, digital assistants, etc.), communications systems (e.g., conference call systems, video conferencing systems, speaker amplification systems, etc.), and so forth. In various embodiments, one or more computing devices 110 are located in various environments including, without limitation, indoor environments (e.g., living room, conference room, conference hall, home office, etc.), and/or outdoor environments, (e.g., patio, rooftop, garden, etc.). The computing device 110 is also able to provide audio signals (e.g., generated using the audio application 122) to speaker(s) 160 to generate a sound field that provides various audio effects.

Figure 2:
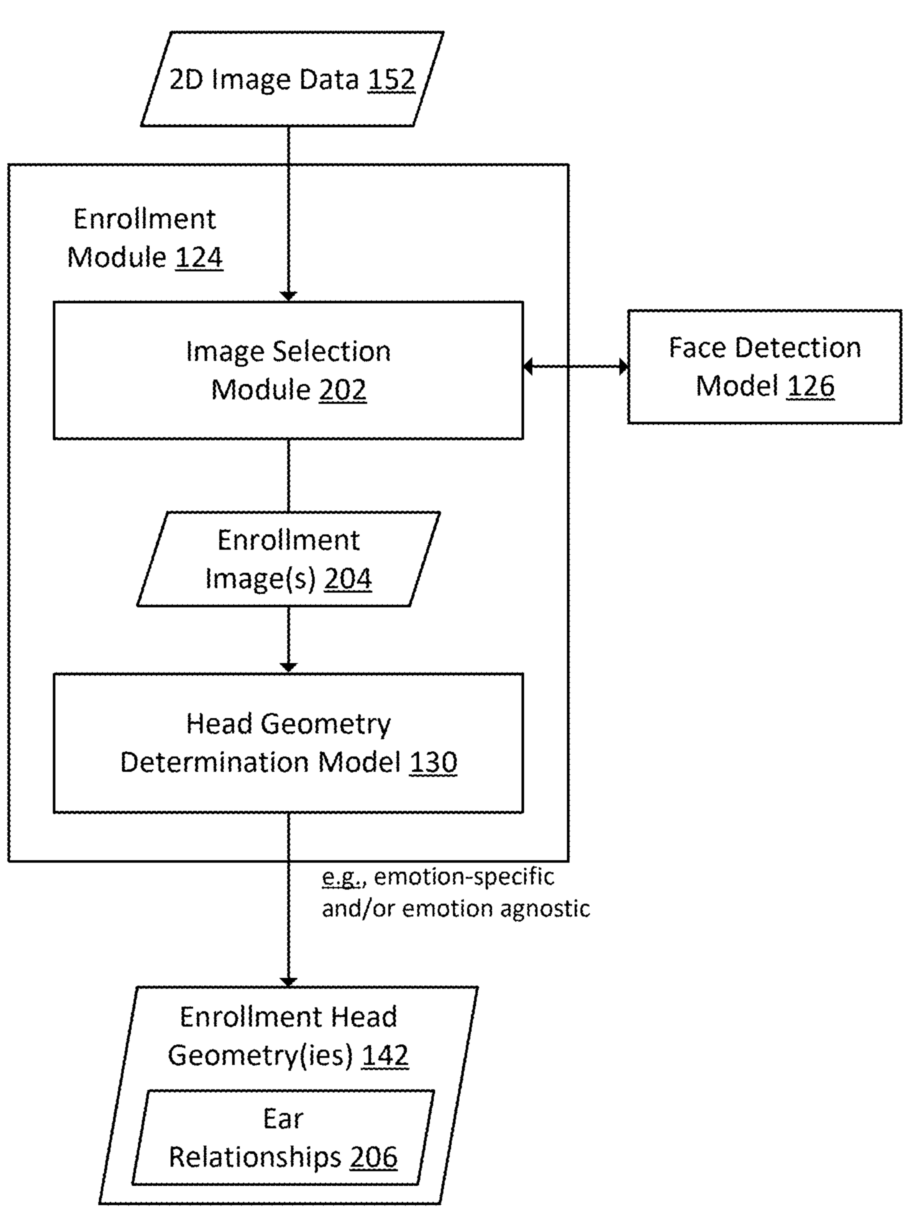
FIG. 2 is a diagram illustrating the enrollment module of FIG. 1, according to various embodiments.

FIG. 2 is a diagram illustrating the enrollment module 124 of FIG. 1, according to various embodiments. As shown, the enrollment module 124 includes, without limitation, an image selection module 202, and the head geometry determination model 130. The enrollment module 124 processes two-dimensional image data 152 as input to generate or output the enrollment head geometry 142. The image selection module 202 includes and/or utilizes, without limitation, the face detection model 126.

In operation, the enrollment module 124 processes a specific subset of the two-dimensional image data 152 to perform an enrollment for the emotion-aware tracking application 120. The enrollment generates one or more user-specific enrollment head geometries 142. In some embodiments, the enrollment module 124 is an emotion-aware enrollment module that generates a set of user-specific and emotion-specific enrollment head geometries 142. In other embodiments, the enrollment module 124 is emotion neutral or agnostic, and generates a single enrollment head geometry 142. The enrollment module 124 also identifies an enrollment scaling factor, corresponding to a ratio between a first distance between a first landmark pair and a second distance between a second landmark pair, where the first landmark pair and the second landmark pair share an intermediate point corresponding to a shared landmark. The enrollment scaling factor operates as a baseline scaling factor. In further embodiments, the emotion-aware tracking application 120 does not include an enrollment module 124. If enrollment is not performed, the baseline scaling factor is a default value such as a minimum value (or other metric) of the first distance added to the second distance, calculated over time using multiple images of the two-dimensional image data 152.

In one example of operation, the enrollment module 124 receives two-dimensional image data 152 captured using a camera 150. For example, the emotion-aware tracking application 120 can acquire the two-dimensional image data 152 from the camera 150 and provide the two-dimensional image data 152 to the enrollment module 124. The enrollment module 124 receives the two-dimensional image data 152 as one or more two-dimensional images. The image selection module 202 selects one or more of the images to be enrollment images 204. In some embodiments, a single enrollment image 204 is selected. However, the image selection module 202 selects any particular number of enrollment images 204 from the two-dimensional image data 152, according to one or more criteria. The image selection module 202 analyzes the two-dimensional image data 152 (e.g., one or more images) to confirm that each enrollment image 204 conforms to the one or more criteria. In examples where the enrollment generates a set of emotion-specific enrollment head geometries 142, the image selection module 202 determines whether the two-dimensional image data 152 corresponds to one or more emotions specified in the one or more criteria. In some examples the enrollment module 124 generates audio (e.g., using the speakers 160) and/or visual (e.g., using a display device, not shown) user instructions indicating for the user to make a particular facial gesture or emotion such as speaking, laughing, smiling, and the like. The user instructions correspond to one or more criteria and increase the likelihood that the two-dimensional image data 152 includes acceptable images for enrollment.

The one or more criteria can specify for the image selection module 202 to select enrollment images 204 for which the face detection model 126 provides a facial emotion, a face detection status, and/or other data. In some embodiments, the image selection module 202 uses the detection of facial landmarks as data indicating that a face is detected in an image. The image selection module 202 includes rules that identify whether two-dimensional facial landmarks correspond to an emotion (e.g., mouth open, mouth closed, smiling, frowning, crying, or any combination thereof). In some embodiments, the criteria also specifies for the image selection module 202 to select enrollment images 204 for which the a particular face orientation status is identified. The image selection module 202 includes rules-based module or program that identifies a face orientation and generates a face orientation status (e.g., centered and/or facing forward, facing upward, facing downward, facing left, facing right) for a particular image. Alternatively, the image selection module 202 references a head orientation identified by comparing or analyzing two-dimensional landmark coordinates (e.g., from the face detection model 126) in view of locations of corresponding landmarks in the generic head geometry 140. The criteria specify a particular head orientation or a range of head orientations. In some embodiments, the criteria can specify for the image selection module 202 to select multiple enrollment images 204 corresponding to a set of different face and/or head orientations.

The image selection module 202 provides the enrollment images 204 to the head geometry determination model 130. The head geometry determination model 130 generates one or more enrollment head geometries 142 that includes a three-dimensional representation of the user's head. In some embodiments, one or more enrollment head geometries 142 include a set of user-specific and emotion-specific enrollment head geometries 142. In other embodiments, a single enrollment head geometry 142. The head geometry determination model 130 is trained and/or configured to generate one or more enrollment head geometries 142 that include three-dimensional locations (e.g., positions or location in three dimensions) for one or more landmarks. The landmarks include, without limitation, each eye (e.g., center, outer point, inner point, etc.), each eyebrow (e.g., outer point, inner point, midpoint, etc.), the nose (e.g., bridge, tip, base, root/radix, glabella, etc.), mouth (e.g., left point, right point, upper midpoint, lower midpoint, etc.), jawline (e.g., left point, right point, upper midpoint, lower midpoint, etc.), each car (e.g., car canal, etc.), and/or the like. The head geometry determination model 130 can take a longer period of time (e.g., relative to the face detection model 126) to process two-dimensional image data 152 and generate the three-dimensional enrollment head geometry 142. As a result, the enrollment process is often not a real-time process. However, the enrollment head geometry 142 generated using the head geometry determination model 130 provides improved accuracy of car locations. The improved ear location accuracy provides noticeable improvements to user experience particularly for personal and/or near-field audio systems such as headrest audio systems.

In order to account for the lack of car landmarks from the face detection model 126, the head geometry determination model 130 generates and/or includes car relationships 206. The car relationships 206 include a set of three-dimensional relationship vectors. The car relationships 206 relate one or more landmarks that are generated by the face detection model 126 (and the head geometry determination model 130), to car locations. In one example, the landmark car relationships 206 relate both ears to a single landmark such as a chin landmark or a nose landmark. Alternatively, each car is related to a different landmark. In some embodiments the head geometry determination model 130 does not generate car landmarks and the car relationships 206 are static relationships such as predetermined or preconfigured relationships. The car relationships 206 can include a relationship between the ears and the landmarks that is incorporated in the enrollment head geometry 142 (or the generic head geometry 140).

The run time of the face detection model 126 is shorter than that of the head geometry determination model 130, enabling the emotion-aware tracking application 120 to use the face detection model 126 in combination with the enrollment head geometry 142, and head orientation data to generate three-dimensional ear positions in real-time, or near-real-time. The face detection model 126 generates two-dimensional landmarks based on the two-dimensional image data 152. The face detection model 126 is trained and/or configured to generate two-dimensional locations (e.g., positions or location in two dimensions) corresponding to one or more landmarks. The landmarks include, without limitation, each eye (e.g., center, outer point, inner point, etc.), each eyebrow (e.g., outer point, inner point, midpoint, etc.), the nose (e.g., bridge, tip, base, root/radix, glabella, etc.), mouth (e.g., left point, right point, upper lip midpoint, lower lip midpoint, etc.), jawline (e.g., left point, right point, upper midpoint, lower midpoint, etc.), each car (e.g., car canal, etc.), and/or the like. In some embodiments, the face detection model 126 does not provide two-dimensional landmark positions for the cars. In some embodiments, the face detection model 126 and the enrollment head geometry 142 generate landmark pairs (in two-dimensional space and three-dimensional space, respectively) that include, without limitation, the edges of both eyes (e.g., outer edges), a bridge to chin landmark pair, a bridge to right jawline landmark pair, a left eye inner edge to left jawline landmark pair, and a right eyebrow inner edge to left jawline pair.

Figure 3:
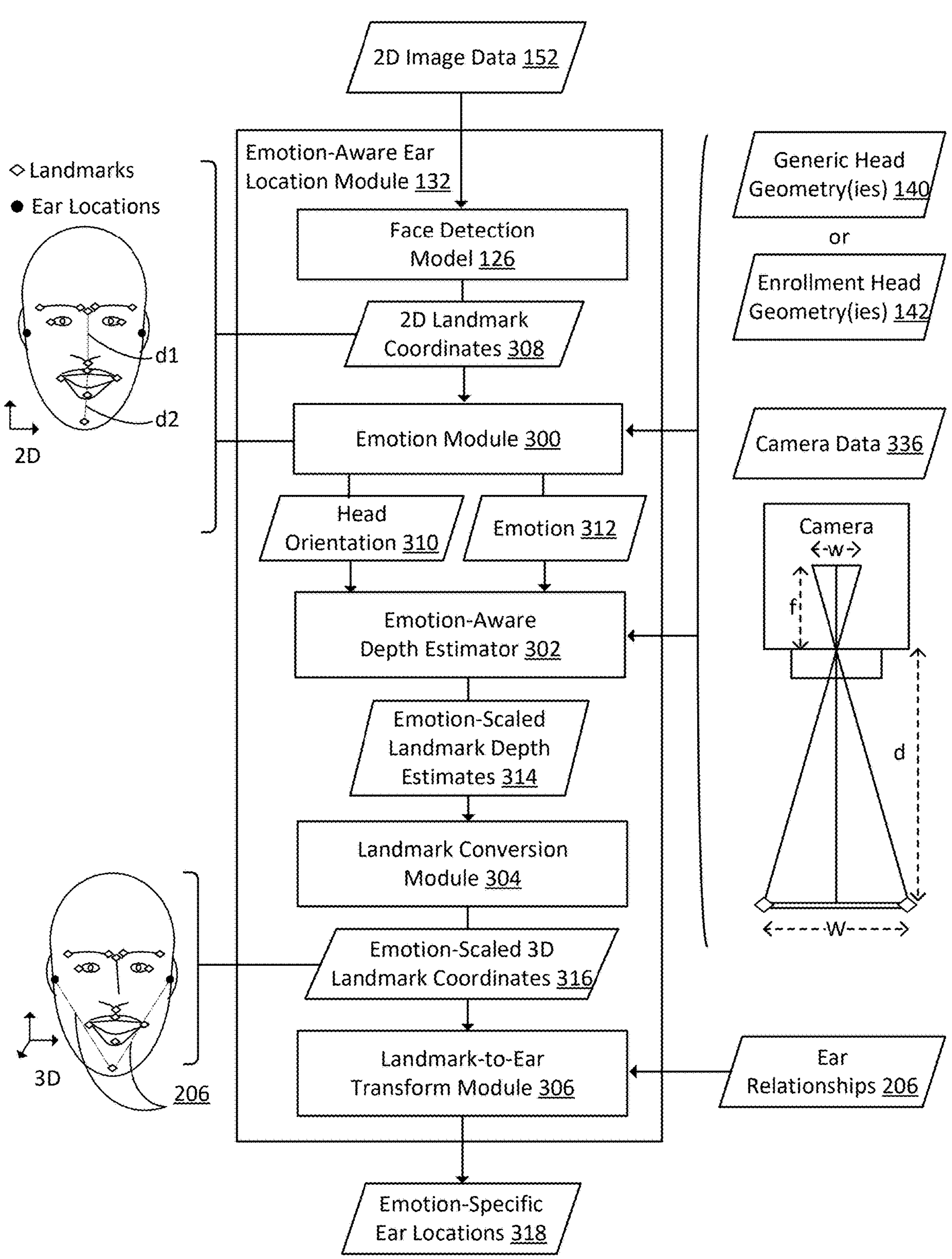
FIG. 3 is a diagram illustrating an emotion-specific ear location module, according to various embodiments.

FIG. 3 is a diagram illustrating an emotion-aware car location module 132, according to various embodiments. As shown, the emotion-aware car location module 132 includes and/or utilizes, without limitation, the face detection model 126, an emotion module 300, an emotion-aware depth estimator 302, a landmark conversion module 306, and a landmark-to-car transform module 306. The emotion-aware car location module 132 receives and/or retrieves and processes the two-dimensional image data 152. The car location process produces intermediate data including, without limitation, two-dimensional landmark coordinates 308, a head orientation 310, an emotion 312, emotion-scaled landmark depth estimates 314, emotion-scaled three-dimensional landmark coordinates 316. The emotion-aware car location module 132 generates data that includes, without limitation, the user-specific car locations 318. The emotion-aware car location module 132 also uses one or more generic head geometries 140, one or more enrollment head geometries 142, camera data 336, and car relationships 206.

The emotion-aware car location module 132 uses the face detection model 126 to generate two-dimensional landmark coordinates 308. The face detection model 126 generates two-dimensional landmark coordinates 308 based on the two-dimensional image data 152. The two-dimensional landmark coordinates 308 are two-dimensional locations for one or more landmarks including, without limitation, one or more eye landmarks (e.g., center, outer point, inner point, etc.), one or more eyebrow landmarks (e.g., outer point, inner point, midpoint, etc.), one or more nose landmarks (e.g., bridge, tip, base, root/radix, glabella, etc.), one or more mouth landmarks (e.g., left point, right point, upper lip midpoint, lower lip midpoint, etc.), one or more jawline landmarks (e.g., left point, right point, upper midpoint, lower midpoint, etc.), and two or more car landmarks (e.g., left car canal, right car canal, etc.), and/or the like. However, in some embodiments the face detection model 126 does not provide ear landmarks. The face detection model 126 stores or otherwise provides the two-dimensional landmark coordinates 308 to the emotion-aware depth estimator 302.

The emotion module 300 analyzes the two-dimensional landmark coordinates 308 to detect an emotion 312 as well as a head orientation 310. The emotion module 300 includes rules that determine the emotion 312 based on distances between landmark pairs as indicated by the two-dimensional landmark coordinates 308. In some examples, the emotion 312 corresponds to an identifier and/or an indicia of the relationships between the landmark pairs. The emotion module 300 generates a head orientation 310 based on the two-dimensional landmark coordinates 308 and the enrollment head geometry 142 or the generic head geometry 140. The enrollment head geometry 142 (or generic head geometry 140) includes three-dimensional locations corresponding to the two-dimensional locations of the two-dimensional landmark coordinates 308. In some embodiments, the head orientation 310 includes a three-dimensional orientation vector.

The emotion-aware depth estimator 302 identifies emotion-scaled landmark depth estimates 314, which can be denoted $\hat{d}_{est}$. In order to identify emotion-scaled landmark depth estimates 314, the emotion-aware depth estimator 302 generates an initial depth estimate based on a head orientation 310, which is based on an enrollment head geometry 142 or a generic head geometry 140. The emotion-aware depth estimator 302 can identify the initial depth estimate based on equation (1).

$$d_{est} = \frac{f * W}{w} \tag{1}$$

In equation (1), a focal length of the camera 150 is indicated as f. The distance between a pair of two-dimensional landmark coordinates 308 is indicated as upper case W. The distance between a pair of two-dimensional landmark coordinates 308 in an image (e.g., two-dimensional image data 152) is indicated as lower case w. The emotion-scaled landmark depth estimates 314 for a pair of two-dimensional landmark coordinates 308 or landmark pair is indicated as $d_{est}$. The focal length of the camera 150 is included in the camera data 336. The distance w in an image can be indicated in a number of pixels, and/or can be generated by multiplying the number of pixels by a physical width of each pixel. The physical width of each pixel can be included in the camera data 336. Equation (1) considers an example where a line connecting the pair of two-dimensional landmark coordinates 308 is orthogonal to a direction that the camera 150 is facing. However, the emotion-aware depth estimator 302 can use the head orientation 310 to improve the accuracy of each emotion-scaled landmark depth estimate 314 where the two-dimensional landmark coordinates 308 are at any angle relative to a direction that the camera 150 is facing (e.g., based on the head orientation 310).

In embodiments where the emotion-aware depth estimator 302 uses a set of emotion-specific enrollment head geometries 142 and/or emotion-specific generic head geometries 140, the emotion 312 is mapped to a particular emotion-specific head geometry. The emotion-aware depth estimator 302 uses the head orientation 310 and the emotion-specific head geometry to identify emotion-scaled landmark depth estimates 314 $\hat{d}_{est}$ using the value for $d_{est}$ that are calculated using the emotion-specific head geometry and equation (1). The result is emotion-scaled based on the emotion-specific enrollment head geometries 142 and/or emotion-specific generic head geometries 140.

However, in embodiments where the emotion-aware depth estimator 302 uses a single enrollment head geometry 142 or a single generic head geometry 140, the emotion-scaled landmark depth estimates 314 emotion-scaling is performed. Emotion-scaling is performed based on equations (2)-(6). The emotion 312 is correlated with one or more distances between pairs of the two-dimensional landmark coordinates 308. For example, a primary landmark distance $LM_{dist}$ can be given by equation (2). Equation (2) breaks up the overall distance $LM_{dist}$ of a primary landmark pair into two sub-distances by adding an intermediate point between the two landmarks.

$$LM_{dist} = d1 + d2 \tag{2}$$

The emotion module 300 breaks an overall distance $LM_{dist}$ between two landmarks into two sub-distances by adding an intermediate point between the two landmarks, for example, according to equation (2). While equation (2) shows an example where all the landmarks are in a straight line, the intermediate landmark can also be offset so that the intermediate landmark is not on a line between the original two landmarks.

In the example shown in FIG. 3, $LM_{dist}$ corresponds to a distance between a primary landmark pair such as a bridge landmark and a chin landmark. The intermediate point corresponds to a nose base. The distance d1 is a distance corresponding to a landmark pair including a bridge landmark and the nose base landmark. The distance d2 is a distance corresponding to a landmark pair including the nose base landmark and the chin landmark. A scaling factor SF is given by equation (3):

$$SF = \frac{d1}{d2} \tag{3}$$

In some embodiments, an enrollment scaling factor $SF_{ENR}$ is identified during enrollment. If an enrollment scaling factor $SF_{ENR}$ is not identified, another baseline scaling factor corresponding to a metric such as a minimum value for d1/d2 is used in place of $SF_{ENR}$. The emotion module 300 also identifies d1/d2 in real-time based on the two-dimensional image data 152. The real-time value for d1/d2 is real-time scaling factor $SF_{RT}$. In the example of $SF_{RT}$, each of d1 and d2 correspond to real-time landmark pair distances.

The emotion module 300 identifies a threshold distance between a selected secondary pair of two-dimensional landmark coordinates 308, and compares the threshold distance to a real-time or most-recently-identified distance between the selected pair of two-dimensional landmark coordinates 308. The secondary landmark pair operates as a trigger to determine whether to scale initial depth estimates. As a result, the secondary landmark pair can be referred to as a triggering pair. The triggering pair generally involves landmarks that move during speaking and/or facial gesturing. For example, emotion module 300 can use equation (4) to identify a mouth open value MO, which is a distance corresponding to a landmark pair including an upper lip midpoint and a lower lip midpoint.

$$MO = \text{upper lip midpoint} - \text{lower lip midpoint} \tag{4}$$

The emotion module 300 identifies a real-time mouth open $MO_{RT}$ in real time, and compares $MO_{RT}$ to a mouth open threshold $MO_{THR}$. $MO_{THR}$ is threshold distance (e.g., magnitude of a distance) between an upper lip midpoint and a lower lip midpoint. While equation (4) relates to a distance between upper lip midpoint and a lower lip midpoint, any real-time landmark pair distance between any landmark pair can be compared to a threshold in order to determine whether to further scale the initial depth estimates. In some examples, the landmarks for the distance d2 is used as the triggering landmark pair.

While equation (4) is indicated as a linear or one-dimensional subtraction, the mouth open value MO can be calculated using two-dimensional landmark coordinates 308. If a real-time landmark pair distance $MO_{RT}$ between the upper lip midpoint and the lower lip midpoint is greater than (or equal to) a threshold distance value $MO_{THR}$, then the emotion module 300 detects a 'mouth open' emotion 312 or another emotion 312. Other distances can also be utilized to identify an emotion 312, such as a distance between a nose base to a chin, a distance between a mouth left point and a mouth right point, and so on. The emotion 312 and the head orientation 310 enables the emotion-aware depth estimator 302 to more accurately identify emotion-scaled landmark depth estimates 314. The emotion module 300 provides the emotion 312 and the head orientation 310 to the emotion-aware depth estimator 302.

The emotion-aware depth estimator 302 generates emotion-scaled landmark depth estimates 314, for respective ones and/or pairs of the two-dimensional landmark coordinates 308. The emotion-aware depth estimator 302 uses one or more of the head orientation 310, the two-dimensional landmark coordinates 308, the enrollment head geometry 142, and the camera data 336 to generate the emotion-scaled landmark depth estimates 314. The emotion-scaled landmark depth estimates 314 can be denoted as $\hat{d}_{est}$. In embodiments where a single head geometry is used, if the emotion-aware depth estimator 302 receives or identifies an emotion 312 indicating that $MO_{RT} \geq MO_{THR}$, then depth estimator 302 determines $\hat{d}_{est}$ according to equation (5).

$$\hat{d}_{est} = d_{est} \times \frac{SF_{ENR}}{SF_{RT}} \tag{5}$$

As indicated in equation (5), an emotion-scaled landmark depth estimate 314 $\hat{d}_{est}$ can be calculated as the initial depth estimate $d_{est}$, scaled by a ratio between the enrollment scaling factor $SF_{ENR}$ and the real-time scaling factor $SF_{RT}$. However, if the emotion-aware depth estimator 302 receives or identifies an emotion 312 indicating that $MO_{RT} < MO_{THR}$, then depth estimator 302 determines $\hat{d}_{est}$ according to equation (6).

$$\hat{d}_{est} = d_{est} \tag{6}$$

As used in equations (5) and (6), $d_{est}$ is an 'initial' or pre-emotion-scaling depth estimate, because a single neutral-emotion head geometry is utilized to generate $d_{est}$ in these equations.

The landmark conversion module 304 generates user-specific emotion-scaled three-dimensional landmark coordinates 316 using the two-dimensional landmark coordinates 308 and the corresponding emotion-scaled landmark depth estimates 314 (e.g., $\hat{d}_{est}$). In some embodiments, emotion-scaled three-dimensional landmark coordinates 316 are generated using equations (7)-(9).

$$X = (X_{img} - P_x) * d_{est} \quad (7)$$

$$Y = (Y_{img} - P_y) * d_{est} \quad (8)$$

$$Z = d_{est} \quad (9)$$

In equations (7)-(9), X, Y, and Z are emotion-scaled three-dimensional landmark coordinates 316 corresponding to three-dimensional landmarks in a three-dimensional space. $X_{img}$ and $Y_{img}$ are two-dimensional landmark coordinates 308 generated by the face detection model 126.

The landmark-to-ear transform module 306 generates the emotion-specific ear locations 318 based on the emotion-scaled three-dimensional landmark coordinates 316. The landmark-to-ear transform module 306 transforms the one or more emotion-scaled three-dimensional landmark coordinates 316 into emotion-specific ear locations 318 by applying the car relationships 206 to the emotion-scaled three-dimensional landmark coordinates 316 indicated as starting points for the ear relationships 206. The ear relationships 206 include a set of three-dimensional relationship vectors, one for each ear. While one example corresponds to a bridge-to-chin pair of the two-dimensional landmark coordinates 308, other pairs can include a glabella-to-chin pair, a glabella-to-nasal-base pair, or another pair that is primarily vertical (e.g., having a greatest difference between the coordinates in a vertical dimension). A pair of two-dimensional landmark coordinates 308 can include an eye-to-eye pair, a jaw-to-jaw pair, or another pair that is primarily horizontal (e.g., greatest difference between the coordinates is in a horizontal dimension). Any landmark pair can be used. Accuracy is increased for landmark pairs that have a greater distance between them. As a result, the bridge-to-chin pair or the glabella-to-chin pair can provide greater accuracy in some embodiments.

Each ear relationship 206 includes a magnitude and a three-dimensional direction. The landmark-to-ear transform module 306 calculates an ear location by setting an initial or starting point of an ear relationship 206 at the emotion-scaled three-dimensional landmark coordinates 316 for a particular landmark in the enrollment head geometry 142. The landmark-to-ear transform module 306 identifies the emotion-specific ear locations 318 as three-dimensional coordinates at a location of the endpoint or terminal point of the ear relationship 206. In some embodiments, the landmark-to-car transform module 306 also uses the head orientation 310, for example, by rotating the ear relationships 206 about a predetermined point in three-dimensional space. For example, if a user is looking to the left (or right), car positions resulting from the car relationships 206 are different than if the user is looking straight forward, because the landmark starting point and head orientation are different. In an instance in which the two-dimensional landmark coordinates 308 and the emotion-scaled three-dimensional landmark coordinates 316 include car landmarks, no landmark-to-car transform is performed. Rather, the emotion-aware car location module 132 utilizes the emotion-scaled three-dimensional landmark coordinates 316 for the car landmarks as the emotion-specific car locations 318. In examples where one or more enrollment head geometries 142 are used, the emotion-specific car locations 318 are also user-specific and scaled to the user.

Figure 4:
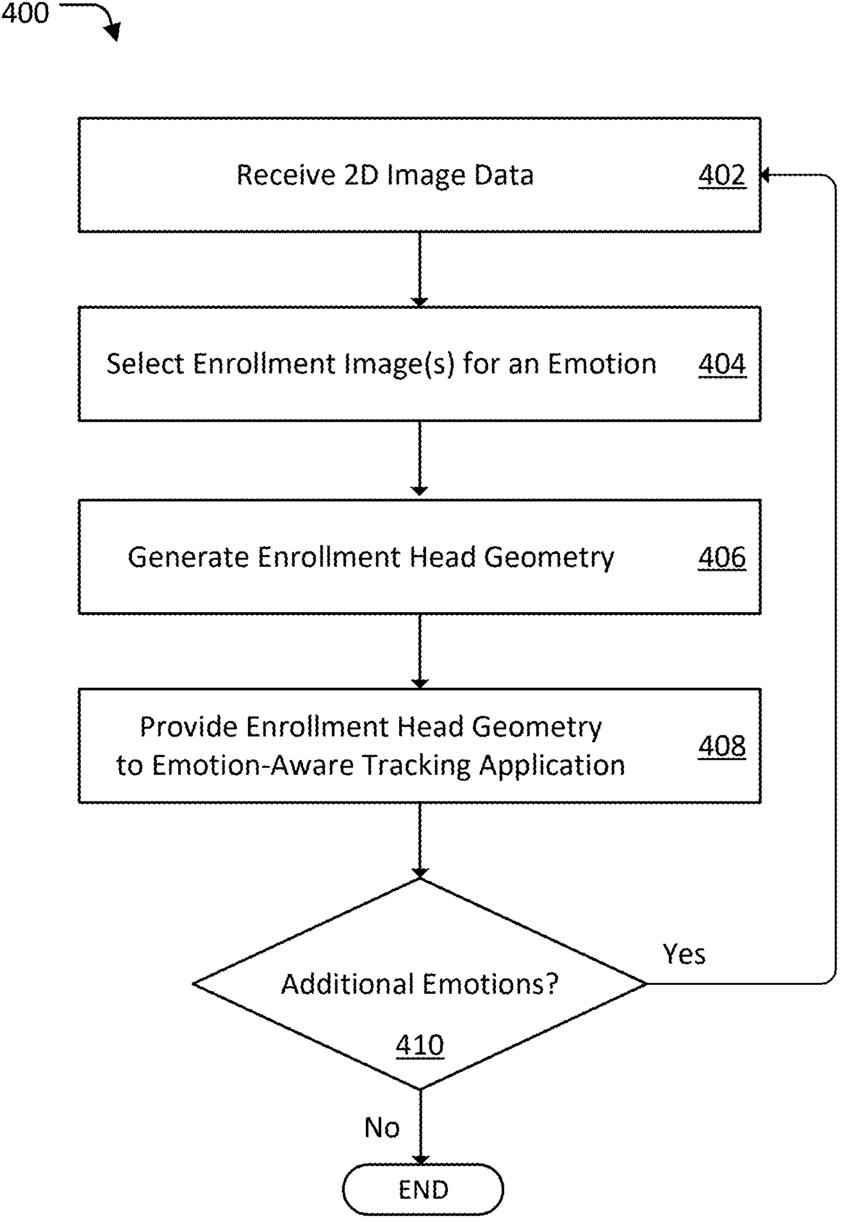
FIG. 4 is a flow diagram of method steps for generating enrollment head geometry, according to various embodiments.

FIG. 4 is a flow diagram of method steps for generating enrollment head geometry, according to various embodiments. Although the method steps are shown in an order, persons skilled in the art will understand that some method steps may be performed in a different order, repeated, omitted, and/or performed by components other than those described in FIG. 4. Although the method steps are described with respect to the systems of FIGS. 1-3, persons skilled in the art will understand that any system configured to perform the method steps, in any order, falls within the scope of the various embodiments.

As shown, a method 400 begins at step 402, where the enrollment module 124 receives two-dimensional image data 152 captured using a camera 150. In some embodiments, the emotion-aware tracking application 120 acquires the two-dimensional image data 152 from the camera 150 and provides the two-dimensional image data 152 to the enrollment module 124. The enrollment module 124 receives the two-dimensional image data 152 as one or more two-dimensional images.

At step 404, the enrollment module 124 selects one or more enrollment images 204 for an emotion 312. The emotion 312 can include a 'neutral' emotion, speaking, laughing, smiling, and/or the like. The enrollment module 124 selects one or more enrollment images 204 from the two-dimensional image data 152 that correspond to the emotion. In some embodiments, a single enrollment image 204 is selected. However, the enrollment module 124 selects any particular number of enrollment images 204 from the two-dimensional image data 152. The enrollment module 124 analyzes the two-dimensional image data 152 (e.g., one or more images) to confirm that each enrollment image 204 conforms to one or more criteria.

The criteria can specify for the enrollment module 124 to select enrollment images 204 for which the face detection model 126 indicates that a face is detected. In some embodiments, the criteria also specifies for the enrollment module 124 to select enrollment images 204 for a particular head orientation or a range of head orientations for a particular emotion 312. In some embodiments, the criteria can specify for the enrollment module 124 to select multiple enrollment images 204 corresponding to a set of different head orientations for the emotion 312. In some embodiments the enrollment module 124 generates audio and/or visual user instructions indicating for the user to make the appropriate emotion 312.

At step 406, the enrollment module 124 generates enrollment head geometry 142 based on the enrollment images 204 for the emotion 312. The image selection module 202 provides the emotion-specific enrollment images 204 to the head geometry determination model 130. The head geometry determination model 130 generates enrollment head geometry 142 that includes three-dimensional locations for one or more emotion-scaled three-dimensional landmark coordinates 316, as well as a three-dimensional representation of the user's head. In some embodiments, the enrollment head geometry 142 includes car relationships 206. The car relationships 206 include a set of three-dimensional relationship vectors that relate one or more landmarks to car locations. In some embodiments, the car locations are emotion-scaled three-dimensional landmark coordinates 316.

At step 408, the enrollment module 124 provides an enrollment head geometry 142 to an emotion-aware tracking application 120. For example, the enrollment module 124 stores the enrollment head geometry 142 in a memory that is accessible to the emotion-aware tracking application 120. In some embodiments, the image selection module 202 transmits a message to the emotion-aware tracking application 120, indicating that the enrollment head geometry 142 is available.

At step 410, the enrollment module 124 determines whether additional emotions 312 are to be captured for additional emotion-specific enrollment head geometries 142. Some embodiments of the enrollment module 124 generate a single enrollment head geometry 142, for example, corresponding to a neutral emotion 312 identified in one or more images of the two-dimensional image data 152. Other embodiments of the enrollment module 124 generate a set of emotion-specific enrollment head geometries 142. In examples where the enrollment module 124 generates a set of emotion-specific enrollment head geometries 142, the selection criteria specify a corresponding set of emotions 312 to identify in the two-dimensional image data 152. The enrollment module 124 determines whether enrollment head geometries 142 are generated and stored for respective ones of the emotions 312 specified in the selection criteria. If the enrollment head geometries 142 corresponding to the emotions 312 are generated and stored, the process ends. However, if enrollment head geometries 142 for one or more emotions 312 are not yet generated and stored, the process moves to step 402.

Figure 5:
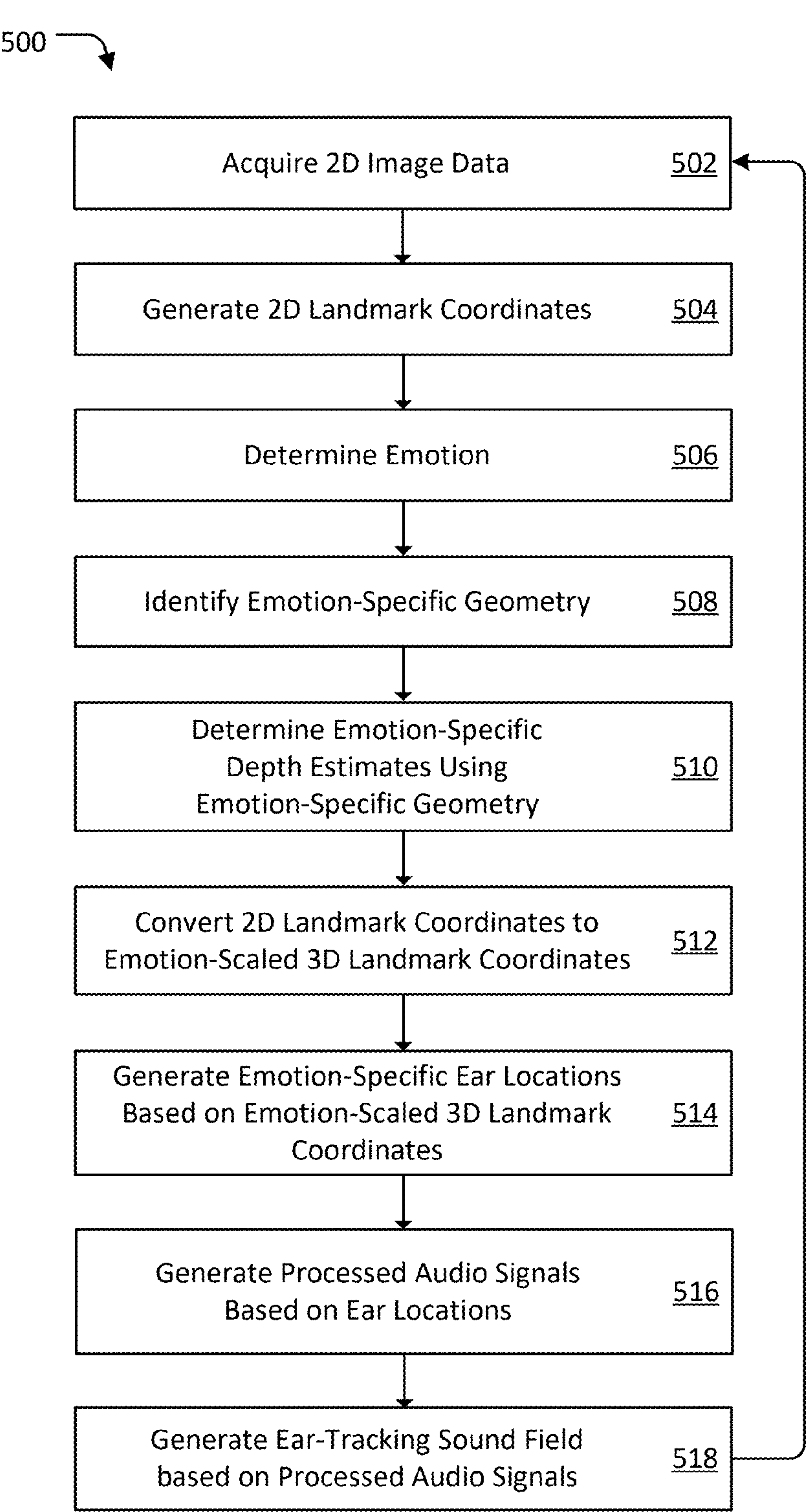
FIG. 5 is a flow diagram of method steps for generating an ear-tracking sound field using emotion-specific geometries, according to various embodiments.

FIG. 5 is a flow diagram of method steps for generating user-specific car locations, according to various embodiments. Although the method steps are shown in an order, persons skilled in the art will understand that some method steps may be performed in a different order, repeated, omitted, and/or performed by components other than those described in FIG. 5. Although the method steps are described with respect to the systems of FIGS. 1-3, persons skilled in the art will understand that any system configured to perform the method steps, in any order, falls within the scope of the various embodiments. FIG. 5 provides an example where the emotion-aware tracking application 120 uses a set of emotion-specific head geometries, such as emotion-specific generic head geometries 140 or emotion-specific (and user-specific) enrollment head geometries 142.

As shown, a method 500 begins at step 502, where the emotion-aware tracking application 120 receives or acquires two-dimensional image data 152. The emotion-aware tracking application 120 retrieves recently captured two-dimensional image data 152 from a memory 114 and/or receives the two-dimensional image data 152 from the camera 150. The two-dimensional image data 152 can include one or more images captured using the camera 150. The emotion-aware tracking application 120 receives and/or retrieves updated two-dimensional image data 152 over time to provide emotion-specific car locations 318 that are dynamically updated in real-time.

At step 504, the emotion-aware tracking application 120 generates two-dimensional landmark coordinates 308. The emotion-aware tracking application 120 uses a face detection model 126 to generate two-dimensional landmark coordinates 308 based on the two-dimensional image data 152. The two-dimensional landmark coordinates 308 are two-dimensional locations for one or more landmarks including, without limitation, one or more eye landmarks (e.g., center, outer point, inner point, etc.), one or more eyebrow landmarks (e.g., outer point, inner point, midpoint, etc.), one or more nose landmarks (e.g., bridge, tip, base, root/radix, glabella, etc.), one or more mouth landmarks (e.g., left point, right point, upper midpoint, lower midpoint, etc.), one or more jawline landmarks (e.g., left point, right point, upper midpoint, lower midpoint, etc.), and two or more car landmarks (e.g., left ear canal, right car canal, etc.), and/or the like. However, in some embodiments the face detection model 126 does not provide car landmarks.

At step 506, the emotion-aware tracking application 120 determines an emotion 312. The emotion module 300 includes rules that identify an emotion 312 based on distances between landmark pairs calculated using the two-dimensional landmark coordinates 308. In one example, the emotion-aware tracking application 120 determines that a first distance between an upper lip midpoint and a lower lip midpoint is greater than a first threshold distance, and a second distance between a mouth left point and a mouth right point is greater than a second threshold distance. The emotion-aware tracking application 120 determines that the user is laughing based on the first distance being greater than the first threshold distance and the second distance being greater than the second threshold distance.

At step 508, the emotion-aware tracking application 120 identifies an emotion-specific head geometry. The emotion-specific head geometry can be an emotion-specific generic head geometry 140 or an emotion-specific enrollment head geometry 142. The emotion-aware tracking application 120 maps the emotion 312 to an emotion-specific generic head geometry 140 or enrollment head geometry 142 corresponding to the emotion 312. In some embodiments, the emotion-aware tracking application 120 also generates a head orientation 310 based on an analysis between the two-dimensional landmark coordinates 308 and the emotion-specific head geometry.

At step 510, the emotion-aware tracking application 120 determines emotion-scaled landmark depth estimates 314. The emotion-aware tracking application 120 uses the head orientation 310 to identify emotion-scaled landmark depth estimates 314. The emotion-aware tracking application 120 identifies emotion-scaled landmark depth estimates 314 for respective ones and/or pairs of the two-dimensional landmark coordinates 308. For example, the emotion-aware tracking application 120 determines $\hat{d}_{est}$ using the value for $d_{est}$ according to equation (1), as described with respect to FIG. 3. While equation (1) considers an example where a line connecting the pair of two-dimensional landmark coordinates 308 is orthogonal to a direction that the camera 150 is facing. However, the emotion-aware tracking application 120 can use the head orientation 310 to improve the accuracy of emotion-scaled landmark depth estimates 314 where the two-dimensional landmark coordinates 308 are at any angle relative to a direction that the camera 150 is facing (e.g., based on the head orientation 310).

At step 512, the emotion-aware tracking application 120 converts the two-dimensional landmark coordinates 308 into emotion-scaled three-dimensional landmark coordinates 316 that are emotion scaled and/or user-specific to the user. The emotion-aware tracking application 120 uses a landmark conversion module 304 to generate emotion-scaled three-dimensional landmark coordinates 316 based on the two-dimensional landmark coordinates 308 and the corresponding emotion-scaled landmark depth estimates 314, for example, using equations (7)-(9).

At step 514, the emotion-aware tracking application 120 generates user-specific car locations based on the emotion-scaled three-dimensional landmark coordinates 316. The emotion-aware tracking application 120 uses a landmark-to-car transform module 306 to generate the emotion-specific car locations 318 based on the emotion-scaled three-dimensional landmark coordinates 316. The landmark-to-car transform module 306 transforms the one or more emotion-scaled three-dimensional landmark coordinates 316 into car locations by applying the car relationships 206 to the emotion-scaled three-dimensional landmark coordinates 316 indicated in the car relationships 206. However, in an instance in which the two-dimensional landmark coordinates 308 and the emotion-scaled three-dimensional landmark coordinates 316 include car landmarks, the emotion-aware tracking application 120 identifies the emotion-scaled three-dimensional landmark coordinates 316 corresponding to car landmarks and uses these emotion-scaled three-dimensional landmark coordinates 316 as the emotion-specific car locations 318.

At step 516, the audio application 122 generates the processed audio signals based on the emotion-specific car locations 318. In some embodiments, the audio application 122 generates the processed audio signals further based on the head orientation 310. For example, the audio application 122 identifies one or more HRTFs based on the emotion-specific car locations 318, head orientation 310, and speaker configuration. The audio application 122 generates the processed audio signals based on the HRTFs to maintain a desired audio effect that dynamically adapts to the emotion-specific car locations 318. The processed audio signals are generated to produce a sound field and/or provide various adaptive audio effects such as noise cancellation, crosstalk cancellation, spatial/positional audio effects and/or the like, where the adaptive audio effects adapt to the emotion-specific car locations 318 of the user. In some embodiments, the computing system 100 includes one or more microphones, and the audio application 122 uses the microphone audio signal and/or other audio signals to generate the processed audio signals. In some embodiments, the audio application 122 generates the processed audio signals further based on a speaker configuration for a set of speakers 160.

At step 518, the audio application 122 provides the processed audio signals to the speakers 160. The speakers 160 generate a sound field based on the processed audio signals. As a result, the sound field includes one or more audio effects that are dynamically adapted to the user in real-time based on the emotion-specific car locations 318 and the head orientation 310. The emotion-specific car locations 318 are also user-specific in embodiments were one or more enrollment head geometries 142 are used. The process proceeds back to step 502 so that the sound field is dynamically adapted based on updated emotion-specific car locations 318 identified using updated two-dimensional image data 152.

Figure 6:
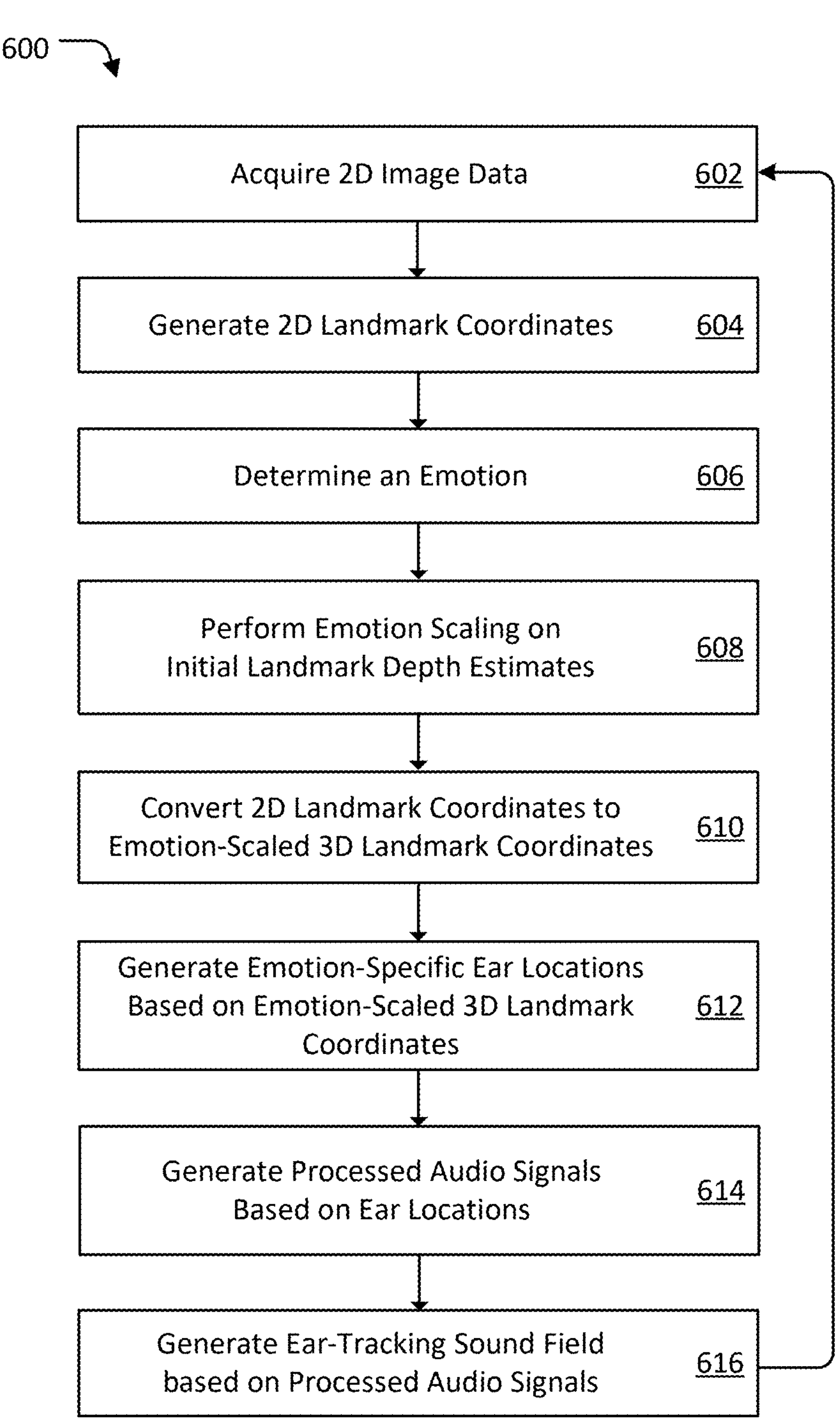
FIG. 6 is a flow diagram of method steps for generating an car-tracking sound field using emotion-specific depth scaling factors, according to various embodiments.

FIG. 6 is a flow diagram of method steps for generating user-specific car locations, according to various embodiments. Although the method steps are shown in an order, persons skilled in the art will understand that some method steps may be performed in a different order, repeated, omitted, and/or performed by components other than those described in FIG. 6. Although the method steps are described with respect to the systems of FIGS. 1-3, persons skilled in the art will understand that any system configured to perform the method steps, in any order, falls within the scope of the various embodiments. FIG. 6 provides an example where the emotion-aware tracking application 120 uses a single head geometry, such as a generic head geometry 140 or an enrollment head geometry 142.

As shown, a method 600 begins at step 602, where the emotion-aware tracking application 120 receives or acquires two-dimensional image data 152. The emotion-aware tracking application 120 retrieves recently captured two-dimensional image data 152 from a memory 114 and/or receives the two-dimensional image data 152 from the camera 150. The two-dimensional image data 152 can include one or more images captured using the camera 150. The emotion-aware tracking application 120 receives and/or retrieves updated two-dimensional image data 152 over time to provide emotion-specific car locations 318 that are dynamically updated in real-time.

At step 604, the emotion-aware tracking application 120 generates two-dimensional landmark coordinates 308. The emotion-aware tracking application 120 uses a face detection model 126 to generate two-dimensional landmark coordinates 308 based on the two-dimensional image data 152. The two-dimensional landmark coordinates 308 are two-dimensional locations for one or more landmarks including, without limitation, one or more eye landmarks (e.g., center, outer point, inner point, etc.), one or more eyebrow landmarks (e.g., outer point, inner point, midpoint, etc.), one or more nose landmarks (e.g., bridge, tip, base, root/radix, glabella, etc.), one or more mouth landmarks (e.g., left point, right point, upper midpoint, lower midpoint, etc.), one or more jawline landmarks (e.g., left point, right point, upper midpoint, lower midpoint, etc.), and two or more car landmarks (e.g., left car canal, right car canal, etc.), and/or the like. However, in some embodiments the face detection model 126 does not provide car landmarks.

At step 606, the emotion-aware tracking application 120 determines an emotion 312. The emotion module 300 includes rules that identify an emotion 312 based on distances between landmark pairs calculated using the two-dimensional landmark coordinates 308, as discussed with respect to equations (2)-(4). In some examples, the emotion-aware tracking application 120 also determines a head orientation 310. The emotion-aware tracking application 120 detects the emotion 312 based on a threshold distance between a triggering landmark pair. In one example, the triggering pair includes an upper lip midpoint and a lower lip midpoint. The emotion-aware tracking application 120 detects an emotion 312 based on a distance between the triggering landmark pair being greater than the threshold distance for the emotion. While a single distance is indicated, the emotion-aware tracking application 120 evaluates any number of triggering landmark pairs in any relation to (e.g., greater than or less than) any number of threshold distances to identify the emotion 312.

The emotion-aware tracking application 120 also uses the real-time landmark pair distances to determine a real-time scaling factor $SF_{RT}$. The real-time scaling factor $SF_{RT}$ is a real-time value for a ratio between a first distance between a first landmark pair and a second distance between a second landmark pair, where the first landmark pair and the second landmark pair share an intermediate point corresponding to a shared landmark, as discussed with respect to equation (3). In some embodiments, the emotion-aware tracking application 120 also generates a head orientation 310 based on an analysis between the two-dimensional landmark coordinates 308 and a single head geometry, such as a generic head geometry 140 or a user-specific enrollment head geometry 142.

At step 608, the emotion-aware tracking application 120 determines emotion-scaled landmark depth estimates 314 by performing emotion scaling on initial landmark depth estimates. The emotion-aware tracking application 120 generates an initial depth estimate based on a head orientation 310, as discussed with respect to equation (1). If the emotion-aware tracking application 120 receives or identifies an emotion 312 indicating that a distance between the triggering landmark pair is greater than (or, alternatively, less than) a threshold distance for the triggering landmark pair (e.g., mouth open, talking, laughing, etc.) then the emotion-aware tracking application 120 determines emotion-scaled landmark depth estimates 314 by scaling an initial depth estimate by a ratio between a baseline or enrollment scaling factor and the real-time scaling factor $SF_{RT}$, as discussed with respect to equation (5). However, if the emotion-aware tracking application 120 receives or identifies an emotion 312 indicating that the distance between the triggering landmark pair is less than (or, alternatively, greater than) a threshold distance for the triggering landmark pair, then the emotion-aware tracking application 120 sets the emotion-scaled landmark depth estimates 314 to the initial depth estimate, as discussed with respect to equation (6).

At step 610, the emotion-aware tracking application 120 converts the two-dimensional landmark coordinates 308 into emotion-scaled three-dimensional landmark coordinates 316 that are emotion scaled and/or user-specific to the user. The emotion-aware tracking application 120 generates emotion-scaled three-dimensional landmark coordinates 316 based on the two-dimensional landmark coordinates 308 and the corresponding emotion-scaled landmark depth estimates 314, for example, using equations (7)-(9).

At step 612, the emotion-aware tracking application 120 generates user-specific car locations based on the emotion-scaled three-dimensional landmark coordinates 316. The emotion-aware tracking application 120 uses a landmark-to-car transform module 306 to generate the emotion-specific car locations 318 based on the emotion-scaled three-dimensional landmark coordinates 316. The landmark-to-car transform module 306 transforms the one or more emotion-scaled three-dimensional landmark coordinates 316 into car locations by applying the car relationships 206 to the emotion-scaled three-dimensional landmark coordinates 316 indicated in the car relationships 206. However, in an instance in which the two-dimensional landmark coordinates 308 and the emotion-scaled three-dimensional landmark coordinates 316 include car landmarks, the emotion-aware tracking application 120 identifies the emotion-scaled three-dimensional landmark coordinates 316 corresponding to car landmarks, and uses these emotion-scaled three-dimensional landmark coordinates 316 as the emotion-specific car locations 318.

At step 614, the audio application 122 generates the processed audio signals based on the emotion-specific car locations 318. In some embodiments, the audio application 122 generates the processed audio signals further based on the head orientation 310. For example, the audio application 122 identifies one or more HRTFs based on the emotion-specific car locations 318, head orientation 310, and speaker configuration. The audio application 122 generates the processed audio signals based on the HRTFs to maintain a desired audio effect that dynamically adapts to the emotion-specific ear locations 318. The processed audio signals are generated to produce a sound field and/or provide various adaptive audio effects such as noise cancellation, crosstalk cancellation, spatial/positional audio effects and/or the like, where the adaptive audio effects adapt to the emotion-specific car locations 318 of the user. In some embodiments, the computing system 100 includes one or more microphones, and the audio application 122 uses the microphone audio signal and/or other audio signals to generate the processed audio signals. In some embodiments, the audio application 122 generates the processed audio signals further based on a speaker configuration for a set of speakers 160.

At step 616, the audio application 122 provides the processed audio signals to the speakers 160. The speakers 160 generate a sound field based on the processed audio signals. As a result, the sound field includes one or more audio effects that are dynamically adapted to the user in real-time based on the emotion-specific car locations 318 and the head orientation 310. The emotion-specific car locations 318 are also user-specific in embodiments were one or more enrollment head geometries 142 are used. The process proceeds back to step 502 so that the sound field is dynamically adapted based on updated emotion-specific car locations 318 identified using updated two-dimensional image data 152.

In sum, techniques are disclosed for head and car tracking using image scaling with emotion detection. Some embodiments involve a method that includes acquiring one or more images of a user, determining an emotion of the user based on the one or more images, processing the one more images to generate emotion-specific three-dimensional (3D) positions of cars of the user based on a 3D head geometry and the emotion of the user, and processing one or more audio signals to generate one or more processed audio signals based on the 3D positions of the ears.

At least one technical advantage of the disclosed techniques relative to the prior art is that, with the disclosed techniques, accuracy of camera-based head and/or car tracking is improved for personal and/or near-field audio systems such as headrest audio systems, seat/chair audio systems, sound bars, vehicle audio systems, and/or the like. The improved camera-based tracking provides improved noise cancellation, improved cross talk cancellation, and otherwise improved three-dimensional audio listening experience to users. The techniques described also disclosed techniques also enable the use of a single standard two-dimensional imaging camera without stereo or depth capabilities to track user-specific scaled ear positions in three dimensions. These technical advantages represent one or more technological improvements over prior art approaches.

Aspects of the disclosure are also described according to the following clauses.

1. In some embodiments, a computer-implemented method comprises acquiring one or more images of a user, determining an emotion of the user based on the one or more images, processing the one more images to generate emotion-specific three-dimensional (3D) positions of ears of the user based on a 3D head geometry and the emotion of the user, and processing one or more audio signals to generate one or more processed audio signals based on the 3D positions of the cars.

2. The computer-implemented method of clause 1, further comprising performing an enrollment that generates the 3D head geometry based on the one or more images of the user.

3. The computer-implemented method of clauses 1 or 2, further comprising performing an enrollment that generates a plurality of emotion-specific 3D head geometries based on the one or more images of the user.

4. The computer-implemented method of any of clauses 1-3, wherein the 3D head geometry includes a generic 3D head geometry or a selected one of a plurality of emotion-specific 3D head geometries.

5. The computer-implemented method of any of clauses 1-4, wherein processing the one more images to generate the emotion-specific 3D positions of ears further comprises determining, based on the 3D head geometry, initial landmark depth estimates for a plurality of landmarks identified in the one more images, and performing, based on the emotion of the user, a scaling of the initial landmark depth estimates to generate the emotion-specific 3D positions of ears.

6. The computer-implemented method of any of clauses 1-5, wherein performing the scaling includes modifying the initial landmark depth estimates based on a baseline scaling factor for a pair of the plurality of landmarks and a real-time scaling factor for the pair of the plurality of landmarks.

7. The computer-implemented method of any of clauses 1-6, wherein processing the one more images to determine the emotion-specific 3D positions of ears comprises selecting an emotion-specific 3D head geometry based on the emotion, and determining emotion-scaled landmark depth estimates using the emotion-specific 3D head geometry, wherein the emotion-specific 3D positions of ears are generated using the emotion-scaled landmark depth estimates.

8. The computer-implemented method of any of clauses 1-7, wherein determining the 3D positions of the ears of the user comprises generating, based on the one or more images, two-dimensional (2D) landmark coordinates for a plurality of landmarks using a face detection model, and generating, using the 3D head geometry, 3D landmark coordinates based on emotion-scaled landmark depth estimates for the 2D landmark coordinates, wherein the emotion-specific 3D positions of ears are based on the 3D landmark coordinates.

9. The computer-implemented method of any of clauses 1-8, wherein the 3D positions of the ears of the user are generated based on one or more ear relationships in the 3D head geometry, wherein the one or more ear relationships relate the 3D landmark coordinates to the emotion-specific 3D positions of the ears.

10. The computer-implemented method of any of clauses 1-9, wherein the plurality of landmarks include one or more of an eye center landmark, an eye outer point landmark, an eye inner point landmark, an eyebrow outer point landmark, and eyebrow inner point, a nose bridge landmark, a nose tip landmark, a nose base landmark, a nose root landmark, a glabella landmark, a mouth tip landmark, an upper lip midpoint landmark, a lower lip midpoint landmark, a chin landmark, or a jawline landmark.

11. The computer-implemented method of any of clauses 1-10, wherein processing the one or more audio signals includes determining one or more head-related transfer functions (HRTFs) based on the 3D positions of the ears, and modifying the one or more audio signals based on the HRTFs to generate the one or more processed audio signals.

12. The computer-implemented method of any of clauses 1-11, further comprising generating, using one or more speakers, a sound field that includes one or more audio effects based on the one or more processed audio signals.

13. The computer-implemented method of any of clauses 1-12, wherein the audio effects include one or more of a spatial audio effect, noise cancellation, or crosstalk cancellation.

14. In some embodiments, one or more non-transitory computer-readable media store instructions that, when executed by one or more processors, cause the one or more processors to perform the steps of receiving two-dimensional (2D) image data of a user, determining an emotion of the user based on the 2D image data, processing the 2D image data to determine emotion-specific three-dimensional (3D) ear positions of the user based on a 3D head geometry and the emotion, and generating one or more processed audio signals based on the 3D ear positions.

15. The one or more non-transitory computer-readable media of clause 14, wherein the steps further comprise generating the 3D head geometry to enroll the user based on the 2D image data.

16. The one or more non-transitory computer-readable media of clauses 14 or 15, wherein the steps further comprise generating a plurality of emotion-specific 3D head geometries to enroll the user based on the 2D image data.

17. The one or more non-transitory computer-readable media of any of clauses 14-16, wherein processing the 2D image data to determine the emotion-specific 3D ear positions further comprises identifying, based on the 3D head geometry, initial landmark depth estimates for a plurality of landmarks identified in the 2D image data, and scaling, based on the emotion of the user, the initial landmark depth estimates to generate the emotion-specific 3D car positions.

18. The one or more non-transitory computer-readable media of any of clauses 14-17, wherein processing the 2D image data to determine the emotion-specific 3D ear positions further comprises selecting an emotion-specific 3D head geometry based on the emotion, and determining emotion-scaled landmark depth estimates using the emotion-specific 3D head geometry, wherein the emotion-specific 3D ear positions are generated using the emotion-scaled landmark depth estimates.

19. The one or more non-transitory computer-readable media of any of clauses 14-18, wherein processing the 2D image data to determine the emotion-specific 3D ear positions further comprises generating, based on the 2D image data, 2D landmark coordinates for a plurality of landmarks using a face detection model, and generating, using the 3D head geometry, 3D landmark coordinates based on emotion-scaled landmark depth estimates for the 2D landmark coordinates, wherein the emotion-specific 3D ear positions are based on the 3D landmark coordinates.

20. In some embodiments, a system comprises one or more speakers, a camera that captures two-dimensional (2D) image data of a user, a memory storing instructions, and one or more processors, that when executing the instructions, are configured to perform the steps of identifying an emotion of the user based on the 2D image data, determining emotion-specific three-dimensional (3D) ear positions of the user based on a 3D head geometry and the emotion, and generating a sound field using the one or more speakers, wherein the sound field includes one or more audio effects based on the 3D ear positions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:

acquiring one or more images of a user;

determining an emotion of the user based on the one or more images;

processing the one more images to generate emotion-specific three-dimensional (3D) positions of ears of the user based on a 3D head geometry and the emotion of the user; and processing one or more audio signals to generate one or more processed audio signals based on the 3D positions of the ears.

2. The computer-implemented method of claim 1, further comprising:

performing an enrollment that generates the 3D head geometry based on the one or more images of the user.

3. The computer-implemented method of claim 1, further comprising:

performing an enrollment that generates a plurality of emotion-specific 3D head geometries based on the one or more images of the user.

4. The computer-implemented method of claim 1, wherein the 3D head geometry includes a generic 3D head geometry or a selected one of a plurality of emotion-specific 3D head geometries.

5. The computer-implemented method of claim 1, wherein processing the one more images to generate the emotion-specific 3D positions of ears further comprises:

determining, based on the 3D head geometry, initial landmark depth estimates for a plurality of landmarks identified in the one more images; and performing, based on the emotion of the user, a scaling of the initial landmark depth estimates to generate the emotion-specific 3D positions of ears.

6. The computer-implemented method of claim 5, wherein performing the scaling includes modifying the initial landmark depth estimates based on a baseline scaling factor for a pair of the plurality of landmarks and a real-time scaling factor for the pair of the plurality of landmarks.

7. The computer-implemented method of claim 1, wherein processing the one more images to determine the emotion-specific 3D positions of ears comprises:

selecting an emotion-specific 3D head geometry based on the emotion, and determining emotion-scaled landmark depth estimates using the emotion-specific 3D head geometry, wherein the emotion-specific 3D positions of ears are generated using the emotion-scaled landmark depth estimates.

8. The computer-implemented method of claim 1, wherein determining the 3D positions of the ears of the user comprises:

generating, based on the one or more images, two-dimensional (2D) landmark coordinates for a plurality of landmarks using a face detection model; and generating, using the 3D head geometry, 3D landmark coordinates based on emotion-scaled landmark depth estimates for the 2D landmark coordinates, wherein the emotion-specific 3D positions of ears are based on the 3D landmark coordinates.

9. The computer-implemented method of claim 8, wherein the 3D positions of the ears of the user are generated based on one or more ear relationships in the 3D head geometry, wherein the one or more ear relationships relate the 3D landmark coordinates to the emotion-specific 3D positions of the ears.

10. The computer-implemented method of claim 8, wherein the plurality of landmarks include one or more of an eye center landmark, an eye outer point landmark, an eye inner point landmark, an eyebrow outer point landmark, and eyebrow inner point, a nose bridge landmark, a nose tip landmark, a nose base landmark, a nose root landmark, a glabella landmark, a mouth tip landmark, an upper lip midpoint landmark, a lower lip midpoint landmark, a chin landmark, or a jawline landmark.

11. The computer-implemented method of claim 1, wherein processing the one or more audio signals includes:

determining one or more head-related transfer functions (HRTFs) based on the 3D positions of the ears; and modifying the one or more audio signals based on the HRTFs to generate the one or more processed audio signals.

12. The computer-implemented method of claim 1, further comprising:

generating, using one or more speakers, a sound field that includes one or more audio effects based on the one or more processed audio signals.

13. The computer-implemented method of claim 12, wherein the audio effects include one or more of a spatial audio effect, noise cancellation, or crosstalk cancellation.

14. One or more non-transitory computer-readable media storing instructions that, when executed by one or more processors, cause the one or more processors to perform the steps of:

receiving two-dimensional (2D) image data of a user;

determining an emotion of the user based on the 2D image data;

processing the 2D image data to determine emotion-specific three-dimensional (3D) ear positions of the user based on a 3D head geometry and the emotion; and generating one or more processed audio signals based on the 3D ear positions.

15. The one or more non-transitory computer-readable media of claim 14, wherein the steps further comprise:

generating the 3D head geometry to enroll the user based on the 2D image data.

16. The one or more non-transitory computer-readable media of claim 14, wherein the steps further comprise:

generating a plurality of emotion-specific 3D head geometries to enroll the user based on the 2D image data.

17. The one or more non-transitory computer-readable media of claim 14, wherein processing the 2D image data to determine the emotion-specific 3D ear positions further comprises:

identifying, based on the 3D head geometry, initial landmark depth estimates for a plurality of landmarks identified in the 2D image data; and scaling, based on the emotion of the user, the initial landmark depth estimates to generate the emotion-specific 3D ear positions.

18. The one or more non-transitory computer-readable media of claim 14, wherein processing the 2D image data to determine the emotion-specific 3D ear positions further comprises:

selecting an emotion-specific 3D head geometry based on the emotion, and determining emotion-scaled landmark depth estimates using the emotion-specific 3D head geometry, wherein the emotion-specific 3D ear positions are generated using the emotion-scaled landmark depth estimates.

19. The one or more non-transitory computer-readable media of claim 14, wherein processing the 2D image data to determine the emotion-specific 3D ear positions further comprises:

generating, based on the 2D image data, 2D landmark coordinates for a plurality of landmarks using a face detection model; and generating, using the 3D head geometry, 3D landmark coordinates based on emotion-scaled landmark depth estimates for the 2D landmark coordinates, wherein the emotion-specific 3D ear positions are based on the 3D landmark coordinates.

20. A system comprising:

one or more speakers;

a camera that captures two-dimensional (2D) image data of a user;

a memory storing instructions; and one or more processors, that when executing the instructions, are configured to perform the steps of:

identifying an emotion of the user based on the 2D image data;

determining emotion-specific three-dimensional (3D) ear positions of the user based on a 3D head geometry and the emotion; and generating a sound field using the one or more speakers, wherein the sound field includes one or more audio effects based on the 3D ear positions.

* * * * *